(12) United States Patent
Rosenwald

(10) Patent No.: US 12,416,253 B2
(45) Date of Patent: Sep. 16, 2025

(54) COMMON DRAIN FOR FLUID CHAMBERS OF A MOTOR VEHICLE DRIVETRAIN FLUID SYSTEM

(71) Applicant: Schaeffler Technologies AG & Co. KG, Herzogenaurach (DE)

(72) Inventor: Andreas Rosenwald, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/133,483

(22) Filed: Apr. 11, 2023

(65) Prior Publication Data

US 2024/0344471 A1 Oct. 17, 2024

(51) Int. Cl.
| | | |
|---|---|---|
| *F01M 11/04* | (2006.01) | |
| *F01M 11/00* | (2006.01) | |
| *F01M 11/02* | (2006.01) | |
| *B60K 11/02* | (2006.01) | |
| *B60L 58/26* | (2019.01) | |
| *F16H 57/04* | (2010.01) | |

(52) U.S. Cl.
CPC ..... *F01M 11/0408* (2013.01); *F01M 11/0004* (2013.01); *F01M 11/02* (2013.01); *B60K 11/02* (2013.01); *B60L 58/26* (2019.02); *F01M 2011/0037* (2013.01); *F01M 2011/0425* (2013.01); *F16H 57/0408* (2013.01); *F16H 57/0412* (2013.01); *F16H 57/0423* (2013.01); *F16H 57/0452* (2013.01)

(58) Field of Classification Search
CPC .......... F01M 11/0408; F01M 11/0004; F01M 11/02; F01M 2011/0037; F01M 2011/0425; B60L 58/26; B60K 11/02; F16H 57/0408; F16H 57/0412; F16H 57/0423; F16H 27/0452
See application file for complete search history.

(56) References Cited

U.S. PATENT DOCUMENTS

| | | | | |
|---|---|---|---|---|
| 2001/0047996 | A1* | 12/2001 | Weingaertner ..... | F01M 11/0004 220/571 |
| 2009/0026014 | A1* | 1/2009 | Martin, III .......... | F16H 57/0408 184/1.5 |
| 2019/0234260 | A1* | 8/2019 | VanDrie ............. | F01M 11/0408 |

* cited by examiner

*Primary Examiner* — Syed O Hasan
(74) *Attorney, Agent, or Firm* — Davidson Kappel LLC

(57) ABSTRACT

A fluid system for a motor vehicle drivetrain is provided including a housing including drain hole, a first fluid chamber for receiving fluid, and a second fluid chamber for receiving fluid, the drain hole coupled to the first fluid chamber and the second fluid chamber for draining fluid from both the first fluid chamber and the second fluid chamber. The fluid system further includes a stopper configured to prevent fluid from draining from the first fluid chamber and the second fluid chamber out of the drain hole in a first orientation of the stopper and configured to allow fluid to drain from the first fluid chamber and the second fluid chamber out of the drain hole in a second orientation of the stopper. The stopper is configured to isolate the first fluid chamber from the second fluid chamber in the first orientation of the stopper.

20 Claims, 2 Drawing Sheets

COMMON DRAIN FOR FLUID CHAMBERS OF A MOTOR VEHICLE DRIVETRAIN FLUID SYSTEM

The present disclosure relates generally to motor vehicle drivetrains and more specifically to fluid systems in motor vehicle drivetrains.

BACKGROUND

Motor vehicle drivetrains include fluid chambers to lubricate rotating parts and/or to cool heat generating components.

SUMMARY

A fluid system for a motor vehicle drivetrain is provided including a housing including drain hole, a first fluid chamber for receiving fluid, and a second fluid chamber for receiving fluid, the drain hole coupled to the first fluid chamber and the second fluid chamber for draining fluid from both the first fluid chamber and the second fluid chamber. The fluid system further includes a stopper configured to prevent fluid from draining from the first fluid chamber and the second fluid chamber out of the drain hole in a first orientation of the stopper and configured to allow fluid to drain from the first fluid chamber and the second fluid chamber out of the drain hole in a second orientation of the stopper. The stopper is configured to isolate the first fluid chamber from the second fluid chamber in the first orientation of the stopper.

In examples, the first fluid chamber includes a first drain line emptying into the drain hole and the second fluid chamber includes a second drain line emptying into the drain hole.

In examples, the first drain lines empties into a side of the drain hole and the second drain lines empties into a top of the drain hole.

In examples, a first surface of the stopper blocks an outlet of the first drain line in the first orientation, and a second surface of the stopper blocks an outlet of the second drain line in the first orientation.

In examples, the stopper includes a seal for sealing the first fluid chamber and the second fluid chamber from an environment outside of the housing.

In examples, the stopper is a drain plug removably installable on the housing to plug the drain hole, a portion of the drain plug being installed in the drain hole in the first orientation, the drain plug being removed from the drain hole in the second orientation.

In examples, the drain plug includes: an exterior section positioned outside of the drain hole in the first orientation; and an interior section positioned inside of the drain hole in the first orientation.

In examples, the first fluid chamber includes a first drain line emptying into the drain hole and the second fluid chamber includes a second drain line emptying into the drain hole, wherein a first surface of the interior section of the drain plug blocks an outlet of the first drain line in the first orientation, and a second surface of the interior section of the drain plug blocks an outlet of the second drain line in the first orientation.

In examples, the interior section of the drain plug includes an external thread and the drain holes includes an internal thread, the external thread being screwed into the internal thread in the first orientation.

In examples, the exterior section of the drain plug includes a head configured to be torqued by a tool to screw the drain plug into the drain hole and into the first orientation, and to unscrew the drain plug from the drain hole and into the second orientation.

In examples, the drain hole has a center axis about which the drain plug is rotatable to screw the drain plug into the drain hole and to unscrew the drain plug from the drain hole, the first fluid chamber including a first drain line emptying radially into the drain hole with respect to the center axis, the second fluid chamber including a second drain line emptying axially into the drain hole with respect to the center axis.

In examples, the drain plug includes a seal for sealing the first fluid chamber and the second fluid chamber from an environment outside of the housing in the first orientation, the seal being sandwiched between the exterior section and the housing in the first orientation.

In examples, the drain hole, the first fluid chamber and the second fluid chamber are configured to cause fluid from the first fluid chamber and fluid from the second fluid chamber to merge inside the drain hole in the second orientation of the stopper.

A motor vehicle drivetrain is also provided including the fluid system, a first rotating and/or heat generating component and a second rotating and/or heat generating component. The first fluid chamber is configured for providing fluid to the first rotating and/or heat generating component, and the second fluid chamber is configured for providing fluid to the second rotating and/or heat generating component.

A method of operating the fluid system is also provided including positioning the stopper in the first orientation; with the stopper in the first orientation, filling the first fluid chamber with fluid and pressuring the fluid in the first fluid chamber at a first pressure, and filling the second fluid chamber with fluid and pressuring the fluid in the second fluid chamber at a second pressure; and positioning the stopper in the second orientation to cause the fluid in the first fluid chamber and the fluid in the second fluid chamber to drain out of the drain hole at a same time.

A method of constructing a fluid system for a motor vehicle drivetrain is also provided. The method includes forming a drain hole into a housing, and fluidically connecting to the drain hole a first fluid chamber for receiving fluid and a second fluid chamber for receiving fluid; and arranging a stopper in the drain hole, the stopper configured to prevent fluid from draining from the first fluid chamber and the second fluid chamber out of the drain hole in a first orientation of the stopper and configured to allow fluid to drain from the first fluid chamber and the second fluid chamber out of the drain hole in a second orientation of the stopper, the stopper configured to isolate the first fluid chamber from the second fluid chamber in the first orientation of the stopper.

In examples, the stopper is a drain plug, and arranging the stopper in the drain hole includes screwing the stopper into the drain hole.

In examples, the drain plug includes an exterior section positioned outside of the drain hole in the first orientation and an interior section positioned inside of the drain hole in the first orientation, and the screwing the stopper into the drain holes including engaging the exterior section via a tool and rotating the drain plug to cause an external thread on the exterior section to advance along an internal thread of the drain hole.

BRIEF DESCRIPTION OF THE DRAWINGS

The present disclosure is described below by reference to the following drawings, in which.

DETAILED DESCRIPTION

Figure 1:
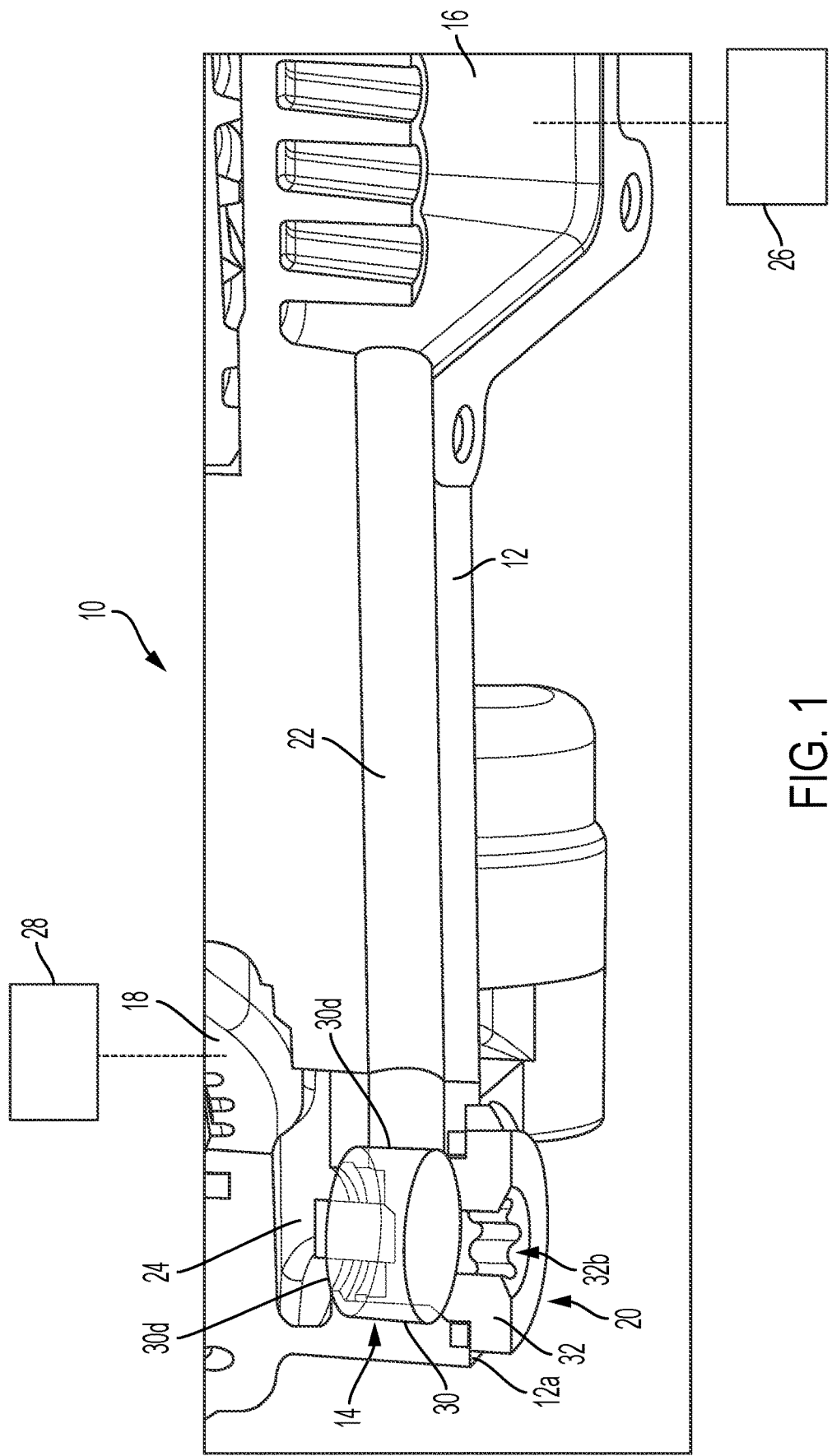
FIG. 1 shows a fluid system configured for use in the drivetrain of a motor vehicle with a stopper in a first orientation plugging a drain hole.
Figure 2:
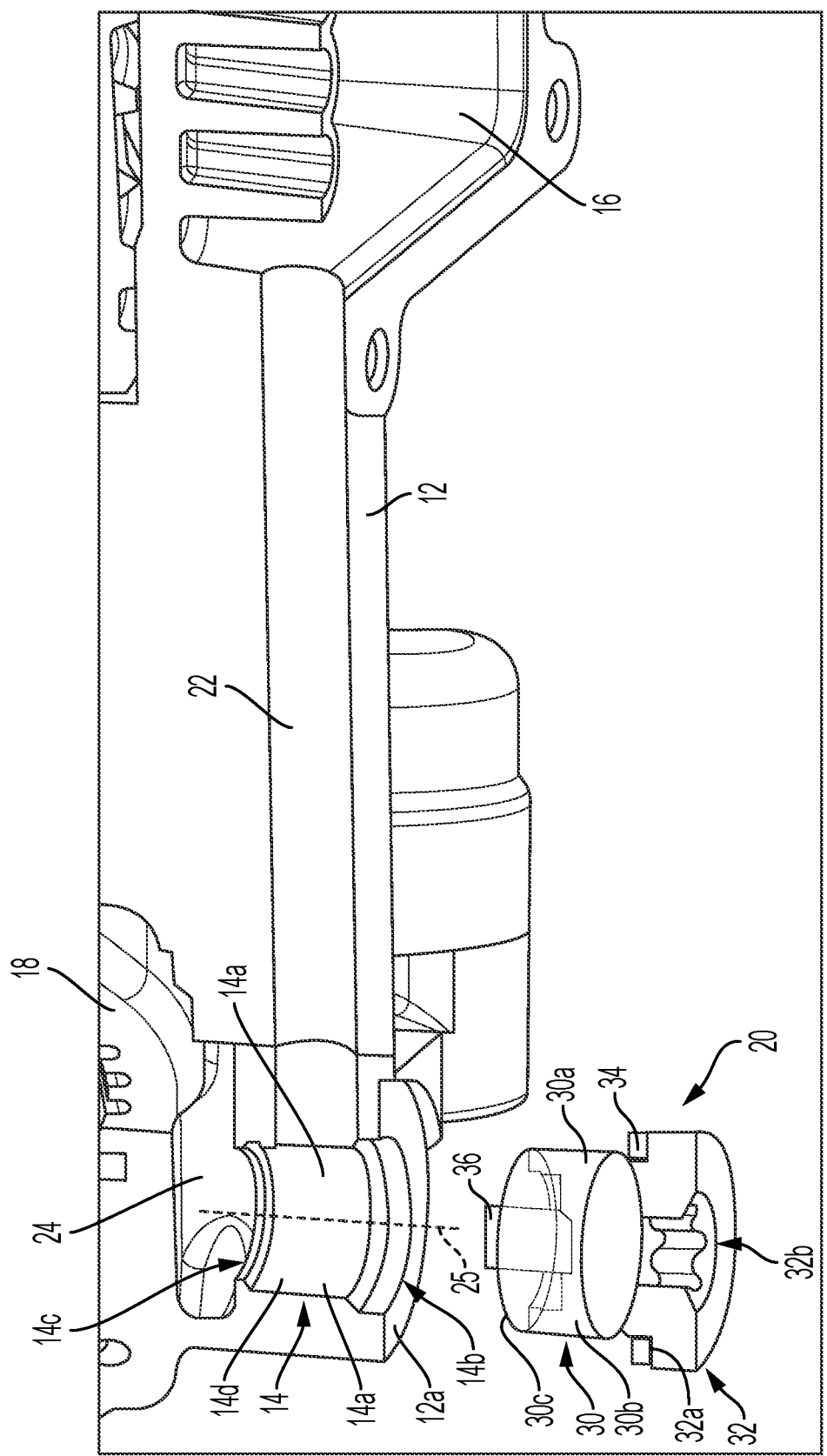
FIG. 2 shows the fluid system of FIG. 2 with the stopper in a second orientation removed from the drain hole.

FIGS. 1 and 2 shows a fluid system 10 configured for use in the drivetrain of a motor vehicle. Fluid system 10 includes a housing 12 including drain hole 14, a first fluid chamber 16 for receiving fluid, and a second fluid chamber 16 for receiving fluid. The drain hole 14 is coupled to the first fluid chamber 16 and the second fluid chamber 18 for draining fluid from both the first fluid chamber 16 and the second fluid chamber 18.

Fluid system 10 further includes a stopper 20 removably installable on the housing 12 and configured to prevent fluid from draining from the first fluid chamber 16 and the second fluid chamber 18 out of the drain hole 14 in a first orientation of the stopper 20. Stopper 20 is also configured to allow fluid to drain from the first fluid chamber 16 and the second fluid chamber 18 out of the drain hole 14 in a second orientation of the stopper 20. The first orientation of stopper 20 is shown in FIG. 1, and the second orientation of stopper 20 is shown in FIG. 2.

In order to prevent pressure equalization of first fluid chamber 16 and second fluid chamber 18 during operation of the drivetrain, the stopper 20 is configured to isolate the first fluid chamber 16 from the second fluid chamber 18 in the first orientation of the stopper 20. The stopper 20 is configured to prevent fluid from draining out of either the first fluid chamber 16 and the second fluid chamber 18 in the first orientation and to allow fluid to flow freely through the drain hole 14 in the second orientation. The stopper 20 also serves to isolate the first fluid chamber 16 from the second chamber when it is in the position where fluid flow is blocked.

The drain hole 14, the first fluid chamber 16 and the second fluid chamber 18 are configured to cause fluid from the first fluid chamber 16 and fluid from the second fluid chamber 18 to merge inside the drain hole 14 in the second orientation of the stopper 20. Using a single drain hole 14 and a single stopper 20 allows the drainage of both of first fluid chamber 16 and second fluid chamber 18 simultaneously with as little effort and components as possible.

The first fluid chamber 16 includes a first drain line 22 emptying into the drain hole 14 and the second fluid chamber 18 includes a second drain line 24 emptying into the drain hole 14. Drain hole 14 is vertically aligned in the bottom of housing 12 and is centered on a vertically extending center axis 25. Drain hole 14 is defined by a vertically extending side wall 14a extending vertically upward from a bottom open end 14b of drain hole 14, through which the fluid from first fluid chamber 16 and second fluid chamber 18 drains, to a top open end 14c of drain hole 14. First drain line 22 extends horizontally from first fluid chamber 16 to drain hole 14, and connects directly to side wall 14a. Second drain line 24 extends horizontally from second fluid chamber 18 to drain hole 14, and connects directly to top open end 14c. In other words, the first drain line 22 empties radially into the drain hole 14 with respect to the center axis 25, and the second drain line 24 empties axially into the drain hole 14 with respect to the center axis 25.

The first fluid chamber 16 is configured for providing fluid to the first rotating and/or heat generating component 26 for lubricating and/or cooling the component 26. The second fluid chamber 18 is configured for providing fluid to the second rotating and/or heat generating component 28 for lubricating and/or cooling the component 28. In other words, each of chambers 16, 18 provides fluid, which can for example be oil or another liquid, to a different component of the drive train. Components 26, 28 can be components of an electric axle that drives the wheels of the vehicle. Components 26, 28 can each be a gear set, an electric motor driving the wheels, power electronics or a battery module powering the electric motor.

In the example shown in FIGS. 1 and 2, stopper 20 is a drain plug including an interior section 30 positioned inside of the drain hole 14 in the first orientation and an exterior section 32 positioned outside of the drain hole 14 in the first orientation. Interior section 30 has a side wall 30a having a shape that is complimentary to side wall 14a of drain line 14 such that when stopper 20 is in the first orientation, side wall 30a engages side wall 14a. More specifically, the side wall 30a of stopper 20 includes an external thread 30b and the side wall 14a of drain hole 14 includes an internal thread 14d, and the external thread 30b is screwed into the internal thread 14d in the first orientation.

Interior section 30 further includes an insertion end 30c that is on the opposite side of side wall 30a as exterior section 32. When stopper 20 is inserted into drain hole 14, insertion end 30c is the first part of stopper 20 to enter into drain hole 14.

Two different surfaces of stopper 20 are used to block the outlets of the drain lines 22, 24 when the stopper 20 is in the position where fluid flow out of drain hole 14 is blocked—i.e., in the first orientation of the stopper 20. A shown in FIG. 1, a first surface 30d of interior section 30 blocks the outlet of the first drain line 22, while a second surface 30e of interior section 30 blocks the outlet of the second drain line 24. This allows stopper 20 to block both of chambers 16, 18 from draining while the stopper 20 is in the first orientation, and to isolate chambers 16, 18 from each other. In the examples shown in FIGS. 1 and 2, the first surface 30d is formed on side wall 30a of stopper 20 and second surface 30e is formed on insertion end 30c of stopper 20.

Exterior section 32 of stopper 20 is wider than interior section 30 of stopper 20, which allows exterior section 32 to abut against an outer surface 12a of housing 12. In particular, exterior section 32 abuts against the outer surface 12a of housing 12 via a seal 34 provided on a housing facing surface 32a of exterior section 32. In the example of FIGS. 1 and 2, seal 34 is a ring and housing facing surface 32a, which faces interior section 30, is ring-shaped. Seal 34 is configured for sealing the first fluid chamber 16 and the second fluid chamber 18 from an environment outside of the housing 12 in the first orientation. The seal 34 is sandwiched between housing facing surface 32a of the exterior section 32 and the housing 12 in the first orientation. Interior section 30 of stopper 20 is provided with a magnet 36 to collect all metal chips from the wear of the mechanical parts in contact with the fluid of fluid chambers 16, 18.

Exterior section 32 of stopper 20 further includes, on a side of exterior section 32 facing away from interior section 30, a head 32b configured to be torqued by a tool to screw the stopper 20 into the drain hole 14 and into the first orientation, and to unscrew the stopper 20 from the drain hole 14 and into the second orientation. The stopper 20 is rotatable about vertically extending center axis 25 of drain hole 14 to screw the stopper 20 into the drain hole 14 and to unscrew the stopper 20 from the drain hole 14.

A method of operating the fluid system 10 includes positioning the stopper 20 in the first orientation within the drain hole 14 so the stopper 20 blocks the fluid from both of chambers 16, 18 from flowing out of drain hole 14, while also isolating chambers 16, 18 from each other so that the pressure of the fluid in first fluid chamber 16 and the pressure of fluid in the second fluid chamber 18 are not equalized during operation of the drivetrain. Next, with the stopper 20 in the first orientation, the first fluid chamber 16 is filled with fluid and the fluid is pressurized to a first pressure, and the second fluid chamber 18 is filled with fluid and the fluid is pressurized to a second pressure different from the first pressure. The pressurization of the fluids in the first and second chambers 16, 18 can occur during operation of the motor vehicle drive train. After operating the motor vehicle drivetrain, the fluid can be drained from both of chambers 16, 18 for maintenance operations. This can advantageously be done in an efficient manner by removing stopper 20 from drain hole 14. In particular, the method can include positioning the stopper 20 in the second orientation to cause the fluid in the first fluid chamber 16 and the fluid in the second fluid chamber 18 to drain out of the drain hole 14 at a same time.

A method of constructing fluid system 10 includes forming drain hole 14 into housing 12, and fluidically connecting first fluid chamber 16 and second fluid chamber 18 to drain hole 14. The method also includes arranging stopper 20 in the drain hole 14 so the stopper 20 prevents fluid from draining from the first fluid chamber 16 and the second fluid chamber 18 out of the drain hole 14 in the first orientation of the stopper 20. This can include screwing the stopper 20 into the drain hole 14 by rotating stopper 20 about center axis 25. The screwing of the stopper 20 into the drain hole 14 includes engaging the exterior section 32 via a tool and rotating the stopper 20 to cause external thread 30*b* on the interior section 30 to advance along internal thread 14*d* of the drain hole 14.

In the preceding specification, the present disclosure has been described with reference to specific exemplary embodiments and examples thereof. It will, however, be evident that various modifications and changes may be made thereto without departing from the broader spirit and scope of present disclosure as set forth in the claims that follow. The specification and drawings are accordingly to be regarded in an illustrative manner rather than a restrictive sense.

LIST OF REFERENCE NUMBERS

10 fluid system
12 housing
12*a* outer surface
14 drain hole
14*a* side wall
14*b* bottom open end
14*c* top open end
14*d* internal thread
16 first fluid chamber
18 second fluid chamber
20 stopper
22 first drain line
24 second drain line
25 center axis
26 components
28 components
30 interior section
30*a* side wall
30 external thread
30*c* insertion end
30*d* first surface
30*e* second surface
32 exterior section
32*a* housing facing surface
32*b* head
34 seal
36 magnet

What is claimed is:

1. A fluid system for a motor vehicle drivetrain comprising:
a housing including drain hole, a first fluid chamber for receiving fluid, and a second fluid chamber for receiving fluid, the drain hole coupled to the first fluid chamber and the second fluid chamber for draining fluid from both the first fluid chamber and the second fluid chamber; and
a stopper configured to prevent fluid from draining from the first fluid chamber and the second fluid chamber out of the drain hole in a first orientation of the stopper and configured to allow fluid to drain from the first fluid chamber and the second fluid chamber out of the drain hole in a second orientation of the stopper, the stopper configured for being insertable upward into the drain hole to isolate the first fluid chamber from the second fluid chamber in the first orientation of the stopper, wherein an outer circumference of the stopper blocks fluid flow from the first fluid chamber,
the stopper including a magnet, wherein the magnet is in an interior section of the stopper along a center axis of the drain hole to collect metal chips from wear of mechanical parts in contact with the fluid of second chamber when the stopper is in the first orientation.

2. The fluid system as recited in claim 1 wherein the first fluid chamber includes a first drain line emptying into the drain hole and the second fluid chamber includes a second drain line emptying into the drain hole.

3. The fluid system as recited in claim 2 wherein the first drain line includes an outlet directly connected to a side of the drain hole and the second drain line includes an outlet directly connected to a top of the drain hole.

4. The fluid system as recited in claim 2 wherein a first surface of the stopper blocks an outlet of the first drain line in the first orientation, and a second surface of the stopper blocks an outlet of the second drain line in the first orientation.

5. The fluid system as recited in claim 1 wherein the stopper includes a seal for sealing the first fluid chamber and the second fluid chamber from an environment outside of the housing.

6. The fluid system as recited in claim 1 wherein the stopper is a drain plug removably installable on the housing to plug the drain hole, a portion of the drain plug being installed in the drain hole in the first orientation, the drain plug being removed from the drain hole in the second orientation.

7. The fluid system as recited in claim 6 wherein the drain plug includes:
an exterior section positioned outside of the drain hole in the first orientation; and
the interior section positioned inside of the drain hole in the first orientation.

8. The fluid system as recited in claim 7 wherein the first fluid chamber includes a first drain line emptying into the drain hole and the second fluid chamber includes a second drain line emptying into the drain hole,
wherein a first surface of the interior section of the drain plug blocks an outlet of the first drain line in the first orientation, and a second surface of the interior section of the drain plug blocks an outlet of the second drain line in the first orientation.

9. The fluid system as recited in claim 7 wherein the interior section of the drain plug includes an external thread and the drain hole includes an internal thread, the external thread being screwed into the internal thread in the first orientation.

10. The fluid system as recited in claim 9 wherein the exterior section of the drain plug includes a head configured to be torqued by a tool to screw the drain plug into the drain hole and into the first orientation, and to unscrew the drain plug from the drain hole and into the second orientation.

11. The fluid system as recited in claim 9 wherein the drain plug is rotatable about the center axis of the drain hole to screw the drain plug into the drain hole and to unscrew the drain plug from the drain hole, the first fluid chamber including a first drain line emptying radially into the drain hole with respect to the center axis, the second fluid chamber including a second drain line emptying axially into the drain hole with respect to the center axis.

12. The fluid system as recited in claim 7 wherein the drain plug includes a seal for sealing the first fluid chamber and the second fluid chamber from an environment outside of the housing in the first orientation, the seal being sandwiched between the exterior section and the housing in the first orientation.

13. The fluid system as recited in claim 1 wherein the drain hole, the first fluid chamber and the second fluid chamber are configured to cause fluid from the first fluid chamber and fluid from the second fluid chamber to merge inside the drain hole in the second orientation of the stopper.

14. A motor vehicle drivetrain comprising:
the fluid system as recited in claim 1;
a first rotating and/or heat generating component, the first fluid chamber configured for providing fluid to the first rotating and/or heat generating component; and
a second rotating and/or heat generating component, the second fluid chamber configured for providing fluid to the second rotating and/or heat generating component.

15. A method of operating the fluid system as recited in claim 1, the method comprising:
positioning the stopper in the first orientation;
with the stopper in the first orientation, filling the first fluid chamber with fluid and pressuring the fluid in the first fluid chamber at a first pressure, and filling the second fluid chamber with fluid and pressuring the fluid in the second fluid chamber at a second pressure; and
positioning the stopper in the second orientation to cause the fluid in the first fluid chamber and the fluid in the second fluid chamber to drain downward out of the drain hole at a same time.

16. A method of constructing a fluid system for a motor vehicle drivetrain, the method comprising:
forming a drain hole into a housing, and fluidically connecting to the drain hole a first fluid chamber for receiving fluid and a second fluid chamber for receiving fluid; and
arranging a stopper in the drain hole, the stopper configured to prevent fluid from draining from the first fluid chamber and the second fluid chamber out of the drain hole in a first orientation of the stopper and configured to allow fluid to drain from the first fluid chamber and the second fluid chamber out of the drain hole in a second orientation of the stopper, the stopper configured for being insertable upward into the drain hole to isolate the first fluid chamber from the second fluid chamber in the first orientation of the stopper, wherein an outer circumference of the stopper blocks fluid flow from the first fluid chamber,
the stopper including a magnet, wherein the magnet is in an interior section of the stopper along a center axis of the drain hole to collect metal chips from wear of mechanical parts in contact with the fluid of second chamber when the stopper is in the first orientation.

17. The method as recited in claim 16 wherein the stopper is a drain plug, and arranging the stopper in the drain hole includes screwing the stopper into the drain hole.

18. The method as recited in claim 17 wherein the drain plug includes:
an exterior section positioned outside of the drain hole in the first orientation; and
an interior section positioned inside of the drain hole in the first orientation, the screwing the stopper into the drain hole including engaging the exterior section via a tool and rotating the drain plug to cause an external thread on the interior section to advance along an internal thread of the drain hole.

19. The fluid system as recited in claim 1 wherein the housing is configured so that upon removal of the stopper from the drain hole, fluid from the second fluid chamber flows downward into the drain hole and then downward out of the drain hole.

20. The fluid system as recited in claim 19 wherein the housing is configured so that upon removal of the stopper from the drain hole, fluid from the first fluid chamber flows horizontally into the drain hole and then downward out of the drain hole.

* * * * *